US010437845B2

(12) United States Patent
Anderson

(10) Patent No.: US 10,437,845 B2
(45) Date of Patent: Oct. 8, 2019

(54) SYSTEM AND METHOD FOR DISPLAYING SEARCH RESULTS FOR A TRADEMARK QUERY IN AN INTERACTIVE GRAPHICAL REPRESENTATION

(71) Applicant: CORSEARCH, INC., New York, NY (US)

(72) Inventor: Stephen C. Anderson, Morris Plains, NJ (US)

(73) Assignee: CORSEARCH, INC., New York, NY (US)

( * ) Notice: Subject to any disclaimer, the term of this patent is extended or adjusted under 35 U.S.C. 154(b) by 474 days.

(21) Appl. No.: 15/147,614

(22) Filed: May 5, 2016

(65) Prior Publication Data

US 2017/0322983 A1    Nov. 9, 2017

(51) Int. Cl.
*G06F 16/248* (2019.01)
*G06F 16/9535* (2019.01)
(Continued)

(52) U.S. Cl.
CPC ......... *G06F 16/248* (2019.01); *G06F 3/0482* (2013.01); *G06F 16/24578* (2019.01); *G06F 16/26* (2019.01); *G06F 16/9535* (2019.01)

(58) Field of Classification Search
CPC .......... G06F 17/30867; G06F 17/3053; G06F 3/0482; G06F 17/30554; G06F 17/30572;
(Continued)

(56) References Cited

U.S. PATENT DOCUMENTS 6,937,254 B2 * 8/2005 Nishiyama .......... G06F 3/04855
345/619
7,346,605 B1    3/2008 Hepworth et al.
(Continued)

FOREIGN PATENT DOCUMENTS

WO    WO-2002099694 A1    12/2002
WO    WO-2010003286 A1    1/2010

OTHER PUBLICATIONS

Andrews et al., Search result visualisation with xFIND, User Interfaces to Data Intensive Systems, Proceedings of Second International Workshop UIDIS 2001 (May 31-Jun. 1, 2001).
(Continued)

*Primary Examiner* — Phong H Nguyen
(74) *Attorney, Agent, or Firm* — Notaro, Michalos & Zaccaria P.C.

(57) ABSTRACT

In response to a query including a proposed trademark and or more search parameters, a system receives search results, each including at least one ascertainable text-based property and a numeric score indicative of a measure of similarity between the search result and the proposed trademark. To generate an interactive graphical representation of the search results, the system (i) generates a reference indicator for the proposed trademark at a reference location in the interactive graphical representation, (ii) determines, for each of the search results, a first offset along a first axis and a second offset along a second axis relative to the reference location using the numeric score and the at least one ascertainable text-based property of a respective search result, and (iii) generates, for each of the search results, a search result indicator in the interactive graphical representation, in accordance with the determined first and second offsets.

16 Claims, 7 Drawing Sheets

(51) Int. Cl.
*G06F 16/2457* (2019.01)
*G06F 3/0482* (2013.01)
*G06F 16/26* (2019.01)

(58) Field of Classification Search
CPC ........... G06F 16/9535; G06F 16/24578; G06F 16/248; G06F 16/26
USPC .................................................. 707/728, 722
See application file for complete search history.

(56) References Cited

U.S. PATENT DOCUMENTS

| | | | |
|---|---|---|---|
| 7,516,416 | B2 | 4/2009 | Viswanathan et al. |
| D614,192 | S | 4/2010 | Takano et al. |
| 8,346,548 | B2 | 1/2013 | Owen |
| D684,585 | S | 6/2013 | Plesnicher et al. |
| D685,813 | S | 7/2013 | Bork et al. |
| 8,589,786 | B2 | 11/2013 | Johnston |
| D697,080 | S | 1/2014 | Scholz et al. |
| D719,176 | S | 12/2014 | Cohen et al. |
| D719,177 | S | 12/2014 | Cohen et al. |
| 8,935,229 | B1 | 1/2015 | Ritchey |
| D732,555 | S | 6/2015 | Schoger et al. |
| D733,167 | S | 6/2015 | Schoger et al. |
| 9,247,014 | B1 * | 1/2016 | Rao .................. G06F 16/907 |
| D765,672 | S | 9/2016 | Raff et al. |
| D769,287 | S | 10/2016 | Lirov et al. |
| D772,941 | S | 11/2016 | Nuovo et al. |
| D781,905 | S | 3/2017 | Nakaguchi et al. |
| D782,515 | S | 3/2017 | Dzjind et al. |
| D783,046 | S | 4/2017 | Dzjind et al. |
| D783,680 | S | 4/2017 | Gauci et al. |
| D786,273 | S | 5/2017 | Herman et al. |
| D792,894 | S | 7/2017 | Dzjind et al. |
| D794,675 | S | 8/2017 | Liu et al. |
| D797,792 | S | 9/2017 | Patterson et al. |
| D798,884 | S | 10/2017 | Kaasalainen et al. |
| 2002/0042784 | A1 | 4/2002 | Kerven et al. |
| 2003/0158743 | A1 | 8/2003 | Havlick et al. |
| 2003/0171949 | A1 | 9/2003 | Degnan et al. |
| 2003/0174173 | A1* | 9/2003 | Nishiyama ......... G06F 3/04855 715/786 |
| 2004/0220903 | A1 | 11/2004 | Shah et al. |
| 2004/0230568 | A1 | 11/2004 | Budzyn |
| 2005/0289473 | A1 | 12/2005 | Gustafson et al. |
| 2007/0133947 | A1* | 6/2007 | Armitage ............ G06F 16/5838 386/224 |
| 2008/0046412 | A1 | 2/2008 | Lee et al. |
| 2008/0065611 | A1 | 3/2008 | Hepworth et al. |
| 2008/0244429 | A1* | 10/2008 | Stading ............... G06F 16/9038 715/764 |
| 2009/0228476 | A1 | 9/2009 | Luther |
| 2010/0229130 | A1 | 9/2010 | Edge et al. |
| 2011/0047166 | A1 | 2/2011 | Stading et al. |
| 2011/0184984 | A1* | 7/2011 | Getner ................ G06F 16/3328 707/779 |
| 2011/0246452 | A1 | 10/2011 | Johnston |
| 2011/0289072 | A1* | 11/2011 | SiMa ..................... G06F 16/21 707/722 |
| 2012/0144499 | A1 | 6/2012 | Tan et al. |
| 2013/0275456 | A1* | 10/2013 | Cheng .................. G06F 16/951 707/769 |
| 2014/0052714 | A1* | 2/2014 | Brodziak ............... G06Q 10/02 707/722 |
| 2014/0096078 | A1 | 4/2014 | Prior |
| 2014/0280104 | A1* | 9/2014 | Summerfield ....... G06Q 50/184 707/724 |
| 2015/0324469 | A1* | 11/2015 | Keyngnaert ............ G06F 16/33 707/706 |
| 2016/0132979 | A1 | 5/2016 | Schneller et al. |
| 2016/0260033 | A1* | 9/2016 | Keyngnaert ......... G06Q 10/063 |

OTHER PUBLICATIONS

International Search Report and Written Opinion, International Application No. PCT/US2017/031026, dated Jul. 10, 2017.

Nguyen et al., A novel visualization model for web search results, IEEE Trans. on Visualization and Computer Graphics, IEEE Service Center, Los Alamitos, California, vol. 12, No. 5, pp. 981-8 (Sep. 1, 2006).

Nowell et al., Visualizing search results, Proceedings of the 19th Annual International ACM SIGIR Conference on Research and Development in Information Retrieval (Aug. 18-22, 1996).

* cited by examiner

300

310 TRADEMARK SEARCH

320 ADD DATABASE ☒ YES ☐ NO  ☒ U.S. ☐ CANADA ☐ U.K.

330 ADD CLASS ☒ YES ☐ NO  ☐ 1 ☐ 2 ☐ 3 ☐ 4 ☐ 5 ☐ 6

340 ADD KEYWORDS ☒ YES ☐ NO

350 ADD STATUS ☒ YES ☐ NO  ☐ ABANDONED ☒ PENDING

360 OWNER NAMES ☒ YES ☐ NO

370 ADD DATES ☒ YES ☐ NO  START / /  END / /

SEARCH

SYSTEM AND METHOD FOR DISPLAYING SEARCH RESULTS FOR A TRADEMARK QUERY IN AN INTERACTIVE GRAPHICAL REPRESENTATION

FIELD OF THE DISCLOSURE

The following disclosure relates to a system and method for providing a visual representation of search results for a trademark query in an interactive graphical representation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The trademark legal clearance and protection industry is currently suffering greatly from "information overload" due to the increase in the amount of information available in the clearance process as a result of technology changes over last few decades. These changes have happened steadily, and the industry has been slow to respond to the change in the amount of information due to a strong culture of tradition in the legal industry.

Information overload is characterized by difficulties a person may encounter when trying to understand complex issues or make a decision due to the presence of too much information. Studies show that decision makers have a limited cognitive processing capacity, and when facing an information overload, there is a higher chance that decision quality will be adversely impacted. The impact of information overload on the trademark legal clearance and protection industry is significant. The industry is struggling to find a balance between risk mitigation and loss of productivity due to increased information in the trademark clearance process.

While the information continues to grow significantly, no new tools are being implemented to curate and present the information so that it may be effectively processed. Current best practices and methods of trademark clearance can no longer support the large data sizes now occurring in the trademark clearance process due to the primitive means for presenting search results. Further, practitioners are struggling to arrive at confident risk analysis decisions and communicate their findings to brand owners due to the challenges of processing such large amounts of cluttered information. Trademark data has grown too large to be effectively analyzed under the current method of performing a clearance search.

The existing systems typically implement serial data review techniques (spreadsheets, lists, full records, etc.), which is daunting for a large set of search results. More particularly, these presentation techniques generally require that the user traverse numerous generations of screens to collect all the necessary information. Moreover, the existing systems do not allow the user to simultaneously review multiple, mutually independent factors when reviewing results during trademark clearance.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present embodiments may be related to a system for displaying an interactive graphical representation of search results to a query for a proposed trademark. The system may be enabled to retrieve search results from various databases. The system may implement a module to make a series of determinations regarding how to display the interactive graphical representation. The present embodiments may display the interactive graphical representation via a display of a client device. The system may modify the display the interactive graphical representation based upon input received via the client device.

One aspect of the technique of the disclosure is a system for generating interactive graphical representations of search results for trademark queries implemented in one or more servers and a user device interconnected via a communication network. The system may include a user interface and a processing hardware configured to: (1) retrieve search results responsive to a query, the query including a proposed trademark and one or more search parameters, and each search result having at least one ascertainable text-based property and a numeric score, wherein the numeric score is indicative of a measure of similarity between the search result and the proposed trademark; and/or (2) generate an interactive graphical representation of the search results, including: (i) generate a reference indicator for the proposed trademark at a reference location in the interactive graphical representation, (ii) determine, for each of the search results, a first offset along a first axis and a second offset along a second axis, the first and second offsets being determined relative to the reference location using the numeric score and the at least one ascertainable text-based property of a respective search result, and/or (iii) generate, for each of the search results, a search result indicator in the interactive graphical representation, in accordance with the determined first and second offsets, wherein at least some of the search result indicators are individually selectable to modify the interactive graphical representation. The system may further be configured to (3) provide the interactive graphical representation via the user interface. The system may include additional, fewer, or alternate actions, including those discussed elsewhere herein.

Another aspect of the technique of the disclosure is server system configured to generate interactive graphical representations of search results for trademark queries for display on user devices. The server system may include one or more processors and a non-transitory computer-readable medium coupled to the one or more processors and storing instructions that, when executed by the one or more processors, implement a method comprising: (1) retrieving search results responsive to a query, the query including a proposed trademark and one or more search parameters, and each search result having at least one ascertainable text-based property and a numeric score, wherein the numeric score is indicative of a measure of similarity between the search result and the proposed trademark; and/or (2) causing a user device to display an interactive graphical representation of the search results via a user interface of the user device, including causing the user device to: (i) display a reference indicator for the proposed trademark at a reference location in the interactive graphical representation, (ii) display, for each of the search results, a respective search result indicator in the interactive graphical representation at a search result location having a first offset along a first axis and a second offset along a second axis, the first and second offsets being relative to the reference location, wherein the search result location is determined using the numeric score and the at least one ascertainable text-based property of the search result, wherein at least some of the search result indicators are individually selectable, and/or (iii) display a modified version of the interactive graphical representation in response to one of the search indicators being selected. The server system may include additional, fewer, or alternate actions, including those discussed elsewhere herein.

In still another aspect of the disclosure is a method for generating interactive graphical representations of search results for trademark queries. The method comprising: (1) retrieving, by one or more processors, search results responsive to a query, the query including a proposed trademark and one or more search parameters, and each search result having at least one ascertainable text-based property and a numeric score, wherein the numeric score is indicative of a measure of similarity between the search result and the proposed trademark; and/or (2) generating, by one or more processors, an interactive graphical representation of the search results, including: (i) generating a reference indicator for the proposed trademark at a reference location in the interactive graphical representation, (ii) determining, for each of the search results, a first offset along a first axis and a second offset along a second axis, the first and second offsets being determined relative to the reference location using the numeric score and the at least one ascertainable text-based property of a respective search result, (iii) generating, for each of the search results, a search result indicator in the interactive graphical representation, in accordance with the determined first and second offsets, wherein at least some of the search result indicators are individually selectable to modify the interactive graphical representation, and/or (iv) providing the interactive graphical representation via a user interface. The method may include additional, fewer, or alternate actions, including those discussed elsewhere herein.

Another aspect of the disclosure is a non-transitory computer-readable medium storing thereon instructions for generating interactive graphical representations of search results for trademark queries, wherein the instructions, when executed on one or more processors, cause the one or more processors to: (1) retrieve search results responsive to a query, the query including a proposed trademark and one or more search parameters, and each search result having at least one ascertainable text-based property and a respective numeric score, wherein the numeric score is indicative of a measure of similarity between the search result and the proposed trademark; and/or (2) generate an interactive graphical representation of the search results, including: (i) generate a reference indicator for the proposed trademark at a reference location in the interactive graphical representation, (ii) determine, for each of the search results, a first offset along a first axis and a second offset along a second axis, the first and second offsets being determined relative to the reference location using the numeric score and the at least one ascertainable text-based property of a respective search result, (iii) generate, for each of the search results, a search result indicator in the interactive graphical representation, in accordance with the determined first and second offsets, wherein at least some of the search result indicators are individually selectable to modify the interactive graphical representation, and/or (iv) provide the interactive graphical representation via a user interface. The non-transitory computer-readable medium storing thereon instructions may include additional, fewer, or alternate actions, including those discussed elsewhere herein.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3 is an exemplary user interface screen which the system of FIG. 1 may present for receiving a trademark query;

FIG. 7 is an illustration of an exemplary user interface screen which the system of FIG. 1 may generate to display a selected search result.

Figure 1:
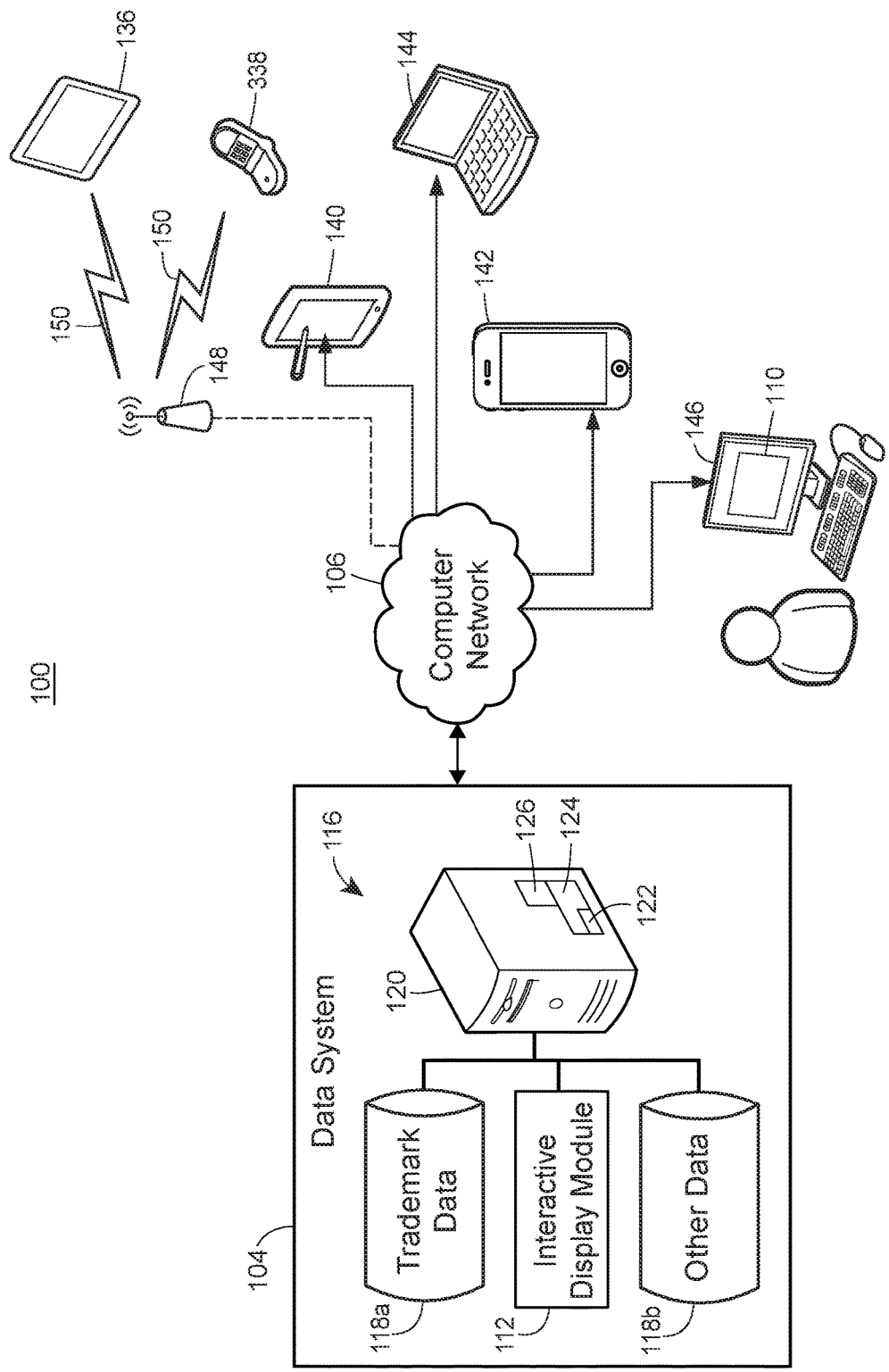
FIG. 1 is a simplified and exemplary block diagram of a system in which techniques for presenting search results for a trademark query an interactive graphical user interface can be implemented.

The example user interfaces of FIGS. 3-7 can be presented via any of the client devices depicted in the system of FIG. 1.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Generally speaking, the techniques of this disclosure are directed to presenting trademark query search results in an interactive and easily interpreted manner. The system of the present disclosure (or another system in communication with this system) analyzes a set of search results corresponding to a query for a proposed trademark to generate and assign a numeric score and, some cases, other properties to each search result. The numeric score is indicative of a comparison between each search result and the proposed trademark. For example, the system may assign to each search result a numeric score indicative of a similarity between the search result and the proposed trademark. Further, the one or more text-based properties can be based on a character string corresponding to each search result and indicate, for example, character length and prefix bias and/or suffix bias (discussed below). The system then organizes, and subsequently displays, search results in a two- (or three-) dimensional interactive graphical representation based on the numeric score and at least one ascertainable text-based property. The system may organize the search results so that the position of the search result indicates multiple parameters at the same time, unlike a traditional list organized along a single dimension. For example, the system may arrange the search results so that both the horizontal and the vertical components of the corresponding indicators (e.g., offsets relative to a reference location) convey respective information to the user. This new visual approach for representing large trademark clearance data sets provides users with an intuitive display of a large number of search results. Moreover, the system reduces the amount screen real estate required to display a certain number of search results, reduces the number of generations of screens which the user must traverse to locate desired information, reduces the amount of time generally required to locate the desired information, etc.

The system may represent the search results relative to a position of an indication of the proposed trademark being cleared so that the user can see more information about the data set as a whole. In other words, the system allows the user to "see the forest for the trees," in contrast to the traditional serial data method. The system also may provide additional interactive functionality and allow the interactive graphical representation to be modified, saved, annotated, exported, etc.

I. Exemplary System

The following section relates to a computing environment for displaying search results for a trademark query in an interactive graphical representation. In an embodiment, the method of FIG. 2 and example user interfaces of FIGS. 3-7 can be implemented via the system described below.

FIG. 1 generally illustrates one embodiment of a system 100 configured to present trademark data in an interactive graphical representation. The system 100 may include processing hardware such as software application(s) executable on one or more processors, as well as various data communication channels for facilitating data communications between the various processing hardware and software components. The system 100 may include clients 136, 138, 140, 142, 144 and/or 146 as front-end components and back-end components 104 in communication with each other via a communication link 106 (e.g., computer network, internet connection, etc.).

The system 100 includes various software and/or computer-executable instructions and/or hardware components and/or modules that may employ the software and/or instructions to present trademark query search results in an interactive graphical representation. The modules may perform the various tasks associated with presenting trademark query search results in an interactive graphical representation, as herein described.

The client devices 136-146 may include, by way of example, a mobile device (such as a tablet computer 136, a cell phone 138, a personal digital assistant (PDA) 140, a smart-phone 142, a laptop computer 144, a portable media player (not shown), a wearable computing device (not shown), a phablet (not shown), a desktop computer 146, other smart devices, devices configured for wired and/or wireless RF (Radio Frequency) communication, etc. Of course, any client or mobile device appropriately configured may interact with the interactive UI system 100.

The client devices 136-146 need not necessarily communicate with the network 106 via a wired connection. In some instances, the client devices 136-146 may communicate with the network 106 via wireless signals 150 and, in some instances, may communicate with the network 106 via an intervening wireless and/or wired device 148, which may be a wireless router, a wireless repeater, a base transceiver station of a mobile telephone provider, etc.

Each of the client devices 136-146 may interact with the data system 116 to receive web pages and/or server data from the server 120 and may display the web pages and/or server data via a client application and/or an Internet browser (described below). For example, the mobile device 142 may display trademark query search results in an interactive graphical representation on a client application and/or through a web page to a user, may receive an input from the user, and may interact with the data system 116. It will be appreciated that although only one server 120 is depicted in FIG. 1, multiple servers 120 may be provided for the purpose of distributing server load, serving different web pages, etc. These multiple servers 120 may include a web server, an entity-specific server (e.g. an Apple® server, etc.), a server that is disposed in a retail and/or proprietary network, etc.

An interactive display module 112 may retrieve data from the various databases 118a and/or 118b. The databases 118a and/or 118b may be maintained by, for example, a government or a private consulting agency. Generally, the trademark data 118a and/or other data 118b may store information relating to trademarks, such as trademarks from various countries and include all information pertinent to trademarks. The module 112 may also be implemented to receive data through client devices 136-146 to be stored in trademark data 118a and/or other data 118b. Although only two databases 118a and 118b are depicted in FIG. 1, multiple databases may be accessed by the system for searching for trademark data.

Each of the search results in the databases 118a and/or 118b may be organized into any suitable data structure that includes multiple fields, or portions of information. For example, each search result may contain at least a string of characters and also include metadata (owner name, filing date, etc.) pertaining to the search result. Further, each search result may also contain fields for a numeric score and one or more ascertainable text-based properties. The system may populate some of the fields dynamically upon analyzing the search results, while some of the fields may be permanent attributes of the corresponding trademark.

The client may implement a GUI 110, which may communicate with the system 116 through the network 106 or other type of suitable network (local area network (LAN), a metropolitan area network (MAN), a wide area network (WAN), a mobile, a wired and/or wireless network, a private network, a virtual private network, etc.). The digital network 106 may be a proprietary network, a secure public Internet, a virtual private network and/or some other type of network, such as dedicated access lines, plain ordinary telephone lines, satellite links, combinations of these, etc. Where the digital network 106 comprises the Internet, data communication may take place over the digital network 106 via an Internet communication protocol.

A system server 120 may send and/or receive information and/or data 118*a* and/or 118*b* for the system 100, such as computer-executable instructions and/or data associated with applications executing on the clients 136-146 (e.g., the interactive display module 112). The module 112 executing within the system 100 may include cloud-based applications, web-based interfaces to the data system 116, software applications executing on the clients, and/or applications including instructions that are executed and/or stored within any component of the system 100. The applications, GUI 110, module 112 and all other software components for presenting search results to a query for a proposed trademark in an interactive graphical representation may be stored in various locations including separate repositories and/or physical locations.

In some embodiments, the data system 116 in general and/or the server 120 in particular may include computer-executable instructions 122 stored within a memory 124 of the server 120 and/or executed using a processor 126. The instructions 122 may instantiate an interactive display module 112 and/or send instructions to the clients 136-146 to instantiate a GUI 110 for the module 112 using a web browser application of a client. In some embodiments, the browser application, GUI 110, interactive display module 112, and/or elements of the data system 116 may be implemented at least partially on the server 120 and/or clients 136-146. The data system 116 and/or processor 126 may execute instructions 122 to display the GUI 110 including the data 118*a* and/or 118*b* within a display of the clients 136-146 and/or server 120 (not shown). For simplicity, only one GUI 110 is provided in the exemplary system 100, although this is not intended to limit the number and/or location of the GUI 110.

In one aspect, the module 112 may be a client application that may be implemented as a series of machine-readable instructions for performing the various tasks associated with implementing the interactive user interface system 100, as well as receiving information, displaying information, and/or transmitting information between devices 136-146 and/or server 120.

In various aspects, the module 112 may be implemented in a stand-alone system and/or as a system wherein the front-end components 136-146 communicate with back-end components 104 as described herein. Additionally, the module 112 may include machine-readable instruction for implementing a user interface to allow a user to input commands to receive information from the interactive user interface system 100 in accordance with the functionality supported by the module 112.

The module 112 may be implemented in a native web browser, such as Apple's Safari®, Google Android™ mobile web browser, Microsoft Internet Explorer® for Mobile, Opera Mobile™, that may be implemented as a series of machine-readable instructions for receiving, interpreting, and/or displaying web page information from the server 120 and/or other back-end components 104 while also receiving inputs from the user. The module 112 may include an embedded web browser that may be implemented as a series of machine-readable instructions for receiving, interpreting, and/or displaying web page information from the servers 120 and/or other back-end components 104 within client devices 136-146.

In one aspect, the module 112 may be an application that is installed on devices 136-146. For example, the interactive display module 112 may be downloaded and/or installed to device 142 by a user. Additionally or alternatively, the module 112 may include instructions for implementing a user interface to allow a user to input commands and/or respond to prompts. For example, the module 112 may allow a user to select clickable icons (such as through a touch screen interface) and/or enter information through text inputs.

The advantages provided to the system by the module 112 can include expending fewer processor cycles generating and presenting the interactive graphical representation for search results of a trademark query compared to a system that does not implement module 112. For example, because the module presents data in a multi-dimensional display, the search results are easier to navigate. In turn, fewer steps (e.g. processing cycles) are required for a user to click through the list of search results to find the most relevant information. Further, the organization of the interactive graphical representation can compact a large number of search results into a small screen space while still maintaining readability. In contrast, previous systems utilize a one-dimensional hierarchical list that is not only tedious to navigate, but also requires multiple pages to present the entirety of the search results.

II. Exemplary Method

Figure 2:
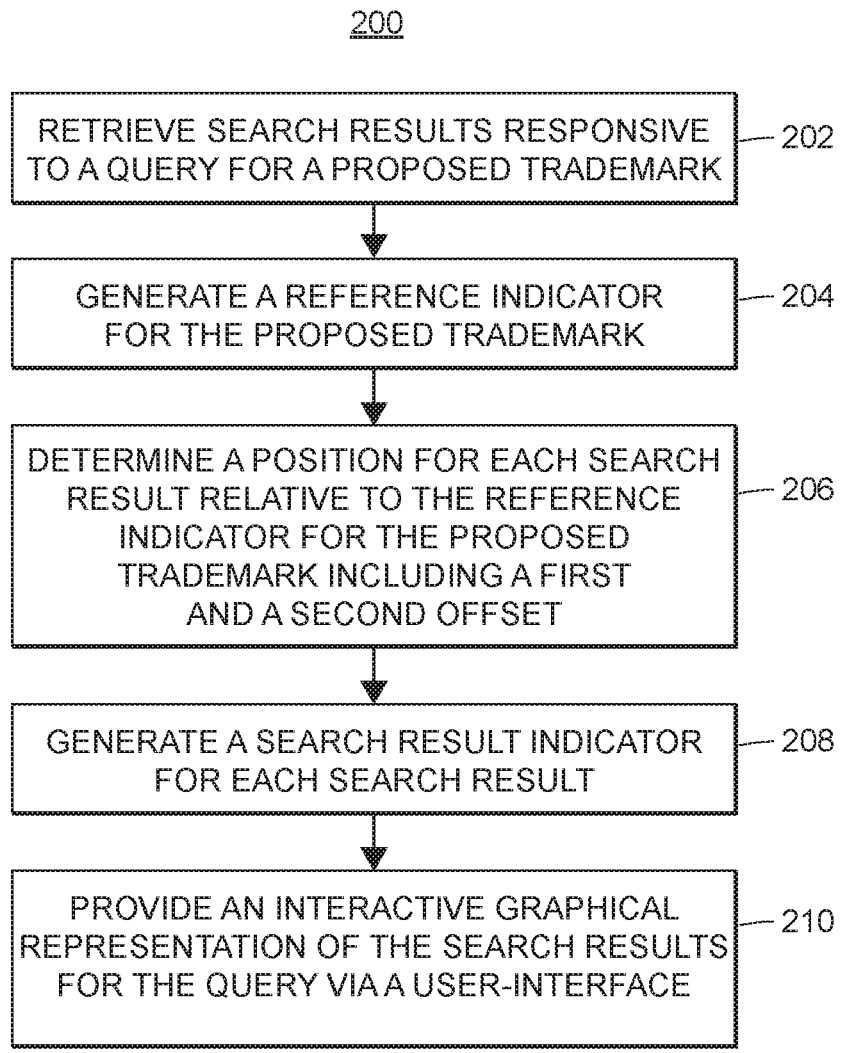
FIG. 2 is a flowchart illustrating an exemplary method for presenting search results for a trademark query an interactive graphical user interface, which can be implemented in the system of FIG. 1.

Now referring to FIG. 2, the system 100 may be employed in a method 200 to present search results for trademark queries in an interactive graphical representation. The method 200 may be implemented using one or more functions and/or routines in the form of non-transitory computer-executable instructions that are stored in a tangible computer-readable storage medium and/or executed using a processor of a computing device (e.g., the client devices 136-146, the server 120, or any combination of computing devices within the system 100). The routines may be included as part of any of the modules described in relation to FIG. 1 above and/or as part of a module that is external to the system illustrated by FIG. 1. For example, the method 200 may be part of a browser application and/or another application running on the client devices 136-146 as a plugin and/or other module of the browser application and may further include user interfaces as illustrated in FIGS. 3-7 below.

The method 200 may begin after the system 100 retrieves search results responsive to a query (Block 202). In some embodiments, the search results may be retrieved in response to multiple queries. In an embodiment, the query or queries may include a proposed trademark including one or more search parameters. The search parameters can include information to help narrow the scope of a trademark clearance investigation. Example search parameters include one or more databases to be searched, one or more classes, one or more keywords corresponding to goods or services, one or more statuses, one or more owner names, one or more dates, etc. Search parameters will be discussed in greater detail with reference to FIGS. 3 and 6, below.

In an embodiment, the search results may be retrieved from one or more databases (such as databases 118*a* and/or 118*b* from FIG. 1) as indicated in the search parameters. In another embodiment, the search results may be retrieved from one or more default databases. The search results may include existing or expired trademarks. In an embodiment, the search results may be a string of characters with at least one ascertainable text-based property. For example, one ascertainable text-based property can be the character length in the search result. In one embodiment, a character length may only account for alphanumeric characters in the search result, while in other embodiments, special characters ('$', '#', spaces, etc.) may also be counted toward the character length.

In another example, an ascertainable text-based property can be a textual bias, where the type of textual bias can be a prefix bias, a suffix bias, or a central (root) bias. The textual bias may indicate which part of the search result is relevant to the proposed trademark. For example, given a query for a proposed trademark "sam," an example search result "Samir" would be identified as having a prefix bias, as the proposed trademark relates to the beginning of the search result. However, an example search result "flotsam" would be identified as having a suffix bias. Continuing with this example, a search result "glucosamine" would also be identified as having a suffix bias, but the suffix bias would not be ranked as highly as in the example search result "flotsam," above.

Alternatively, in another embodiment the textual bias may be based on which portion of the proposed trademark corresponds to the search result. In this embodiment, a search result "all" would have a suffix bias for a given proposed trademark of "Marshall." In at least some embodiments, the ascertainable text-based property can be expressed as a numeric value.

Further, retrieved search results can be analyzed using one or more suitable techniques to determine a numeric score indicative of a measure of similarity between the search result and the proposed trademark of the query. In some embodiments, the numeric scores will be retrieved along with the search results. In other embodiments, the system will analyze the retrieved search results to determine numeric scores and other properties corresponding to the search result. In some embodiments, some of the numeric scores can be retrieved with the search results while others are to be determined by the system of the present disclosure.

Any suitable technique can be used to determine the numeric score indicative of the degree of similarity (e.g. calculating the Levenshtein distance). The numeric score can be any suitable metric for ranking similarity such as a percentage, a number score in a scaled set, etc. In one embodiment, the similarity may be based only on a comparison of the character strings of the proposed mark to the search result. In another embodiment, other factors, such as a phonetic comparison between the proposed trademark and the search result, may influence the determination of a numeric score measuring similarity.

In some embodiments, the system may determine a second numeric score indicative of a measure of relevance between the search result and the proposed trademark of the query, where relevance is a measure of similarity and additional factors based on the one or more search parameters. For example, for a proposed trademark T and a certain result R, the system may calculate the similarity score S, which in the percentage format can corresponds to 85%. The system then may adjust the score upward or downward in response to determining that the proposed trademark T and R share some similarity in classification or, conversely, belong to different classes. More generally, the system can calculate relevance using similarity and one or more additional parameters, which also may be assigned different respective weights according to the particular implementation.

Figure 4:
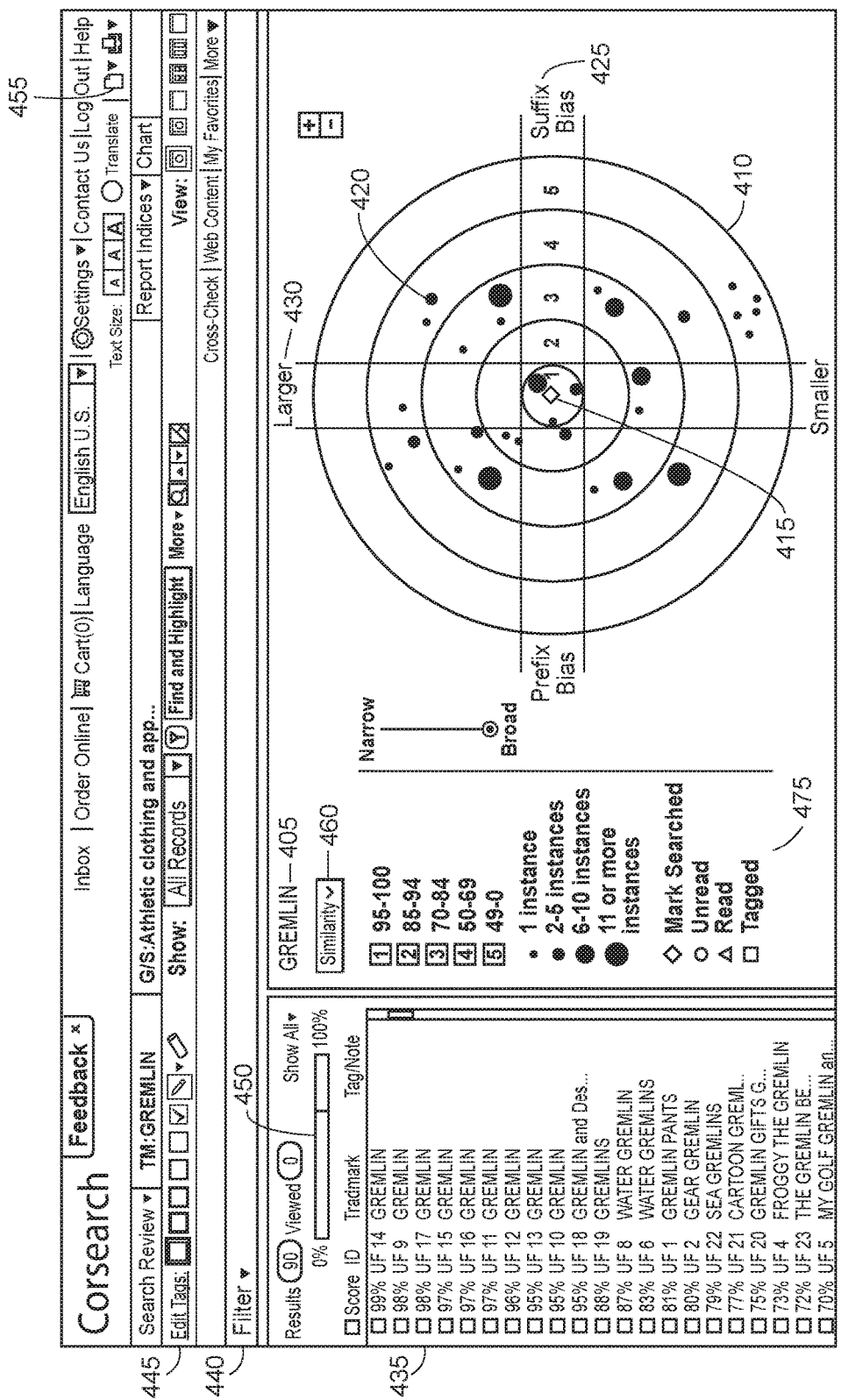
FIG. 4 is an exemplary user interface screen which the system of FIG. 1 may generate to provide an interactive graphical representation of search results responsive to a query for a proposed trademark.

Once the search results are retrieved, the system may generate an interactive graphical representation of the search results (Blocks 204-208), as illustrated below in FIGS. 4-6. To generate the interactive graphical representation, the system may begin by first generating a reference indicator for the proposed trademark at a reference location (Block 204). In an embodiment including multiple queries, one proposed trademark may be selected to be represented by the reference indicator. In an embodiment, the reference indicator for the proposed trademark may be the center of a Cartesian coordinate system (x-axis, y-axis). In another embodiment, the reference indicator for the proposed trademark may be the center of a shape such as a circle, a square, a polygon, etc. In still another embodiment, the reference indicator for the proposed trademark may be located in the center of a number of concentric circles overlaid by a Cartesian coordinate system, where the origin of the Cartesian coordinate system is located at the center of the concentric circles (as illustrated in FIG. 4). The above examples are not intended to be limiting, and the reference indicator for the proposed trademark may be located in any suitable 2-D and/or 3-D environment for displaying search result in an interactive graphical representation.

The reference indicator for the proposed trademark may be denoted by a star, an asterisk, a diamond, an arrow, and/or any other distinguishing mark. The reference indicator for the proposed trademark may also be a particular color or highlighted to stand out from the rest of the interactive graphical representation. In an embodiment, the reference indicator for the proposed trademark may be animated to appear as flashing, spinning, etc.

Next, the system may determine a position of each search result relative to the reference indicator for the proposed trademark (Block 206). The position of each search result relative to the reference indicator may be expressed visually in a 2-D or 3-D format. In an embodiment, the position of each search result may correspond to an (x,y) coordinate, where the reference indicator for the proposed trademark is located at the origin (0,0). In this embodiment, the position of each search result contains a first offset (x-coordinate) and a second offset (y-coordinate). The first and second offset for each search result may be based on the numeric score and the at least one ascertainable text-based property. The above embodiment and all examples below are not intended to be limiting and can easily be extended to another configuration, such as a 3-D environment.

In an embodiment, for a given search result, the total distance (d) from the reference indicator for the proposed trademark may be based on the numeric score, which may be the similarity score or the relevance score, depending on the scenario. In this embodiment, the search result must lie somewhere on the perimeter (or proximate to the perimeter) of a circle with radius d centered at the reference indicator for the proposed trademark. Typically, search results with a higher similarity score will have a shorter distance d than search results with a lower similarity score. In turn, search results that are deemed to be more similar will appear radially closer to the reference indicator for the proposed trademark. The visual "closeness" of the search results with higher similarity provides a user with an intuitive and easily understood graphical display of the search results.

The exact position of the search result on the circle of radius d may further be based on at least one ascertainable text based property. In this embodiment, one axis may correspond to the ascertainable text-based property corresponding to the character length in the search result, while the other axis may correspond to the ascertainable text-based property corresponding to the textual bias. As an example, the Y-axis may correspond to the character length in the search results, with negative values for search results comprising character strings smaller or shorter than the proposed mark and positive values for search results comprising character strings larger or longer than or equal to the proposed mark. Similarly, the X-axis may correspond to the textual bias, with negative values corresponding to a prefix bias and positive values corresponding to a suffix bias. In another embodiment, the X-axis corresponds to the character length while the Y-axis corresponds to the textual bias. Further, in some embodiments, the X- and/or the Y-axis can indicate more than one parameter or factor, e.g., character length+phonetic similarity.

To consider a more specific example (in which the X-axis corresponds to textual bias and the Y-axis corresponds to character length), given a query for the proposed mark "Marsh," the search result "Marshall" may have a numeric score of 90% and a corresponding radial distance d. In this example, the reference indicator for the proposed mark "Marsh" can be located at the origin (0,0) of a Cartesian coordinate plane. A search result indicator for the search result "Marshall" must have coordinates that are approximately at a distance d from the origin, with the location dependent on the at least one ascertainable text based property. Thus, the system may further solve for a first offset (x-axis) and a second offset (y-axis) that will place the search result indicator at a distance d from the origin.

In this example, the ascertainable text-based property corresponding to the character length of the search result will indicate that the search result is longer than the proposed mark (positive y-value), as "Marshall" is longer than "Marsh". Further, the ascertainable text-based property corresponding to the textual bias indicates a prefix bias, as the portion of the search result that corresponds to the proposed mark is in the beginning of the string (negative x-value). Thus, the search result "Marshall" would fall in the quadrant corresponding to longer length of characters and a prefix textual bias (−x,y), or the II quadrant of a Cartesian plane. The exact coordinates, or offsets, of the search result depend on calculations based on the numeric similarity score and the two ascertainable text-based values.

Expanding on the example above for the proposed mark "Marsh," another search result "all marsh" may also have a numeric score of 90%. In an embodiment, the search result "all marsh" may have the same ascertainable text-based property corresponding to the character length as the previous example "Marshall." However, unlike "Marshall," the search result "all marsh" may have an ascertainable text-based property corresponding to the textual bias indicating a suffix bias. In this example, the search result indicator for each of the two search results "Marshall" and "all marsh" would be the same distance from the reference indicator for the proposed mark, however the two results would be in different quadrants. Thus, if the coordinates for "Marshall" are (−x,y), the coordinates for "all marsh" would be (x,y).

In another example, the proposed trademark "phone" may have a search result "fone" that has a high numeric score based on the shared characters "one" and the high phonetic similarity. Thus, the search result "fone" would be a small distance d from the proposed trademark "phone." In this example, because "fone" is shorter than "phone," the ascertainable text-based property corresponding to the character length of the search result may indicate that the search result is shorter than the proposed mark (negative y-value). Further, because the shared characters "one" are located at the end of "phone," the system may determine that the search result has an ascertainable text-based property corresponding to textual bias indicating a suffix bias (positive x-value). Thus, the system may place the search result "fone" in the IV quadrant of the Cartesian plane, or slightly below the x-axis and slightly to the right of the y-axis.

Once a position of each search result is determined, the system may begin to generate search result indicators for each of the search results in the interactive graphical representation (Block 208). Each search result may be placed relative to the reference indicator for the proposed trademark based on the determined first and second offset. Further, each search result may be assigned a unique icon based on the properties of the search result. For example, if a search result has been previously viewed by a user, the search result may be displayed as a white circle with a black outline, while unviewed search results may be displayed as a black circle. Further, if two or more search results are positioned relatively closely to one another, the search results might be clustered into a single search result indicator that is that is larger than the search result indicator corresponding to fewer search results. The above examples are not intended to be limiting and search result indicators can be of any suitable size, shape, color and/or animated. In some embodiments, the search result indicator may be illustrated (a logo, an emoticon, etc.), may contain text, and/or contain other suitable visual features.

Further, search result indicators may also contain other properties that may help provide a user with further information to the corresponding search results. For example, a search result indicator may contain a link to a web page, a link to a pop-up including details of the one or more search results, etc. Further, the search result indicators may be configured to display information if indication is received that a cursor is "hovering" over the search result indicator. Further still, search result indicators may be manipulated based on gestures received via a user interface, as discussed in greater detail below.

Once the system has generated an interactive graphical representation (Blocks 204-208, above), the system may provide the interactive graphical representation of the search results for the query (or queries) via a user interface (Block 210). The interactive graphical representation may be presented, for example, in any one of the client devices 136-146 of FIG. 1 above, and example user interfaces can be seen in FIGS. 4-7 below. In some embodiments, the system may generate a list of trademarks corresponding to the search results and subsequently display the list of trademarks adjacent to the interactive graphical representation.

Further, once displayed, the interactive graphical representation may then be modified based on user inputs. The system may allow a user to zoom, pan, scroll, swipe, or otherwise manipulate the view of the interactive graphical representation. The system may also allow a user to add or remove search parameters, or otherwise edit the query for the proposed mark. Similarly, the system may allow a user to apply and/or remove a filter (FIG. 5) to adjust the interactive graphical representation. Changes to the query (including filters) may cause the system to perform the steps of method 200 once again.

Figure 6:
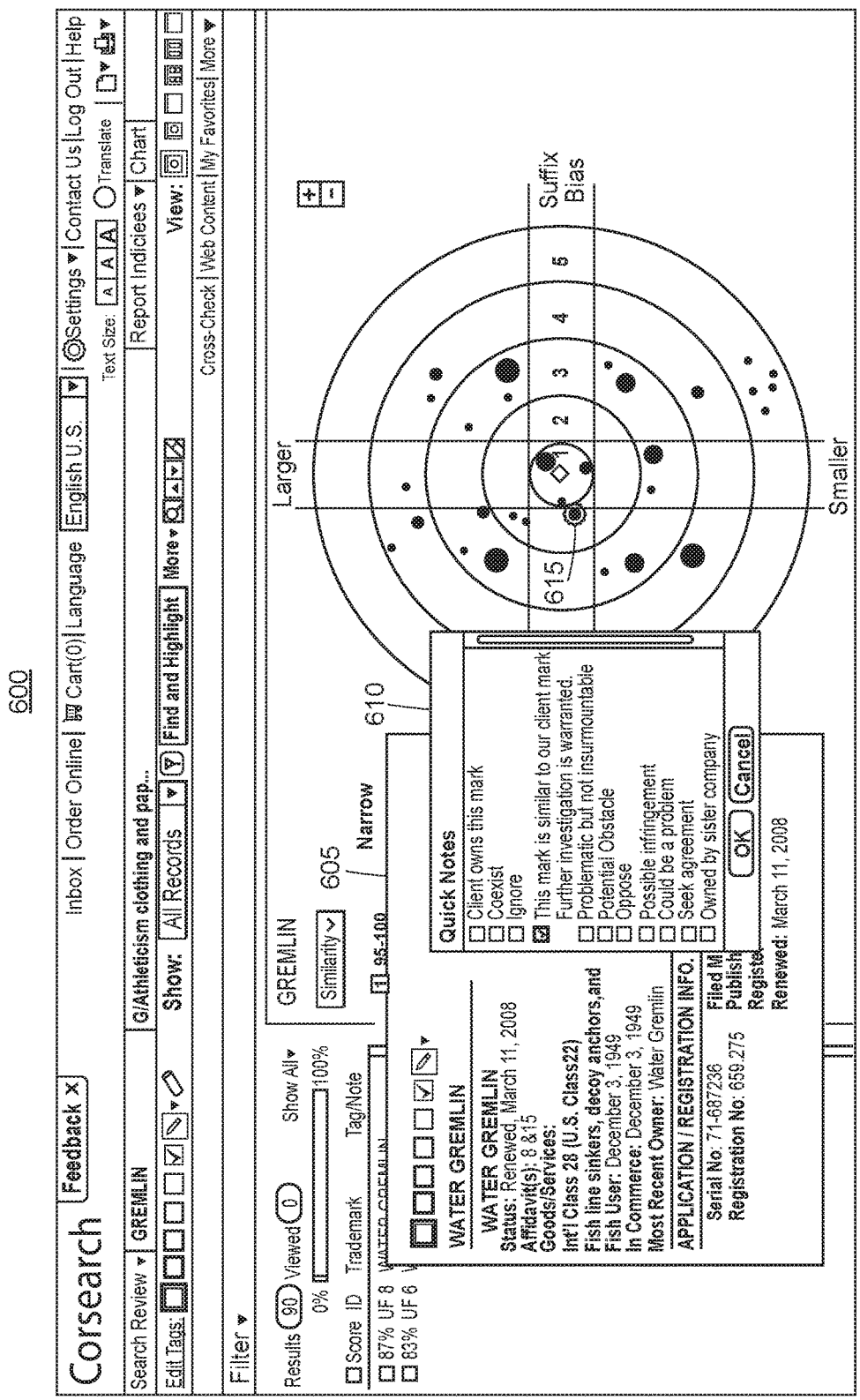
FIG. 6 is an illustration of an exemplary user interface screen which the system of FIG. 1 may generate to provide an interactive graphical representation of search results along with a selected search result.
Figure 7:
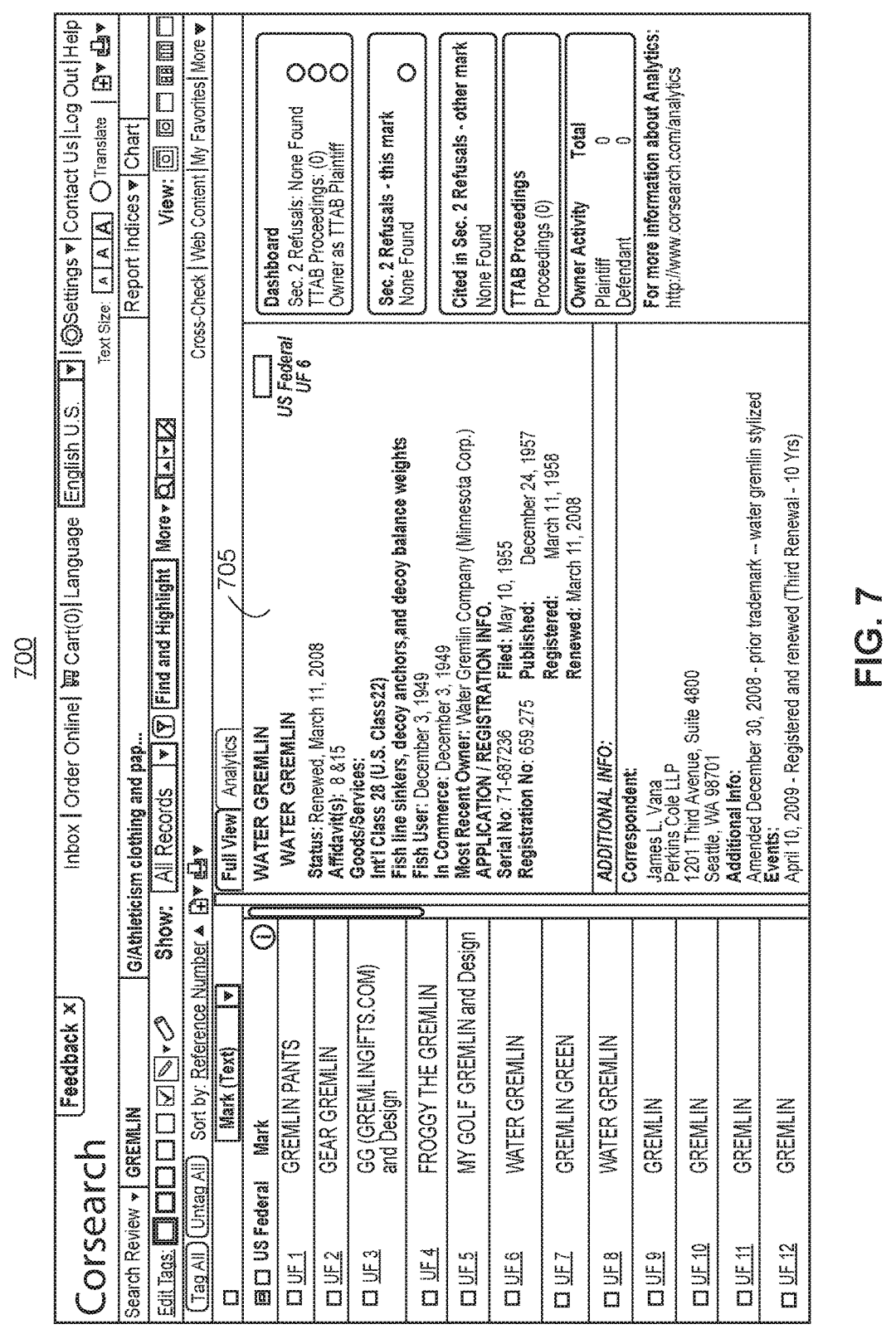

Further, the user may also individually select one or more search result indicators to be modified, or to view further details of the selected search results (FIGS. 6 and 7). For example, a user may change the position of a selected search result indicator, in turn modifying the numeric score and/or the at least one ascertainable text-based property (and subsequently the first offset and/or the second offset) of the corresponding search result(s). By changing the position of the selected search result indicator, the user is essentially independently "re-ranking" the search results. The user can further re-rank search results through the list of trademarks adjacent to the interactive graphical representation. A user may further edit selected search results by adding notes, highlighting the search result indicator, changing the icon of a search result indicator, and/or removing a search result indicator.

III. Exemplary Query Interface

In an embodiment, the system 100 may receive a trademark query through a user interface. FIG. 3 is an illustration of an exemplary user interface 300 for receiving a trademark query. The interface may include a search bar 310 to receive one or more character strings indicative of a proposed trademark for a query. In an embodiment, a user of the system may only enter information in the search bar 310 and then proceed with requesting search results. In this embodiment, the system may enter default selections for the other search parameters (320-370). However, the user may choose to select search parameters related to one or more databases 320, one or more classes 330, one or more keywords 340, a status 350, one or more owner names 360 and one or more dates 370.

The trademark query can be directed to one or more particular databases 320. In an embodiment, each database 320 can correspond to trademarks from a particular country. In another embodiment, each database 320 may be indicative of a particular type of trademark, or of some other factor used for classifying and storing trademarks. Further, a user may choose to enter a search parameter related to a class 330 for the proposed trademark. A trademark class 330 generally indicates the type of good or service corresponding to the mark. For example, trademarks of Class 1 generally include chemical products used in industry, science and agriculture, including those which go to the making of products belonging to other classes. Currently, there are 45 classes established by United States Patent and Trademark Office.

A keyword 340 is a further indication of the type of good or service corresponding to the proposed trademark. For example, even if a user selects Class 25 (related to trademarks for clothing, footwear and headgear), the user may want to further focus the search by entering one or more keywords such as "pants," and/or "shorts." The user may also enter a search parameter indicating one or more statuses 350 for the search results. A status 350 is an indication of the current standing of the trademark. For example, a trademark status 350 can be abandoned, cancelled, approved, pending, etc.

The user may further narrow the search by adding one or more owner names 360. For example, a user may enter an owner name "Bob" along with the trademark query. In this example, only trademarks belonging to Bob would appear in the search results. This may be an advantageous for users that are concerned with one or more particular competitors. A user may also narrow the search by selecting one or more dates 370. In an embodiment, the search parameter for dates 370 may eliminate any trademarks that do not fall within a certain time frame. The query interface 300 is not intended to be limiting, and the number of search parameters may be expanded or narrowed based on the needs of the system. Certain embodiments may contain some, all and/or additional search parameters compared to the search parameters 310-370 listed above.

IV. Exemplary Interactive Graphical Representation

FIGS. 4-7 illustrate example interfaces corresponding to one embodiment of the system of the present disclosure. FIG. 4 is an illustration of an example interface 400 displaying an interactive graphical representation of search results for a query for a proposed trademark. The example interface 400 may be displayed via the user interface of one of the client devices 136-146 of FIG. 1 above. In the example interface of FIGS. 4-7 the proposed trademark is "Gremlin." In this embodiment, the system displays the interactive graphical representation 410 as a number of concentric circles over-laid on a Cartesian coordinate plane. The system may place the reference indicator for the proposed trademark 415 at both the origin of the Cartesian coordinate plane and center of the concentric circles.

The system may display the search result indicators 420 as dots of various size and of various distance from the reference indicator 415. As discussed above, the system places each search result indicator 420 relative to the reference indicator 415 based on a first and second offset determined based on a numeric score and at least one ascertainable text-based property. Further, although each search result indicator 420 in the example interface 400 is represented as a dot, the search result indicators 420 may be represented in a variety of shapes based on properties of the search result, as indicated in the index 475. For example, if the system determines that a search result indicator 420 has been previously selected, the selected search result may then be illustrated as a triangle. The system may vary the size of the search result indicator 420 depending on the number of search results corresponding to the search result indicator 420, as explained with reference to index 475. In some embodiments, the system may receive a selection of a search result indicator and, in turn, expand the "cluster." If the system receives a selection of a cluster, the system may present information corresponding to all of the search results contained by the cluster. Further, the system may receive an indication to zoom in on the interactive graphical representation 410, which may also cause the system to disperse the clusters into smaller search result indicators 420 representing fewer search results.

Further, in some embodiments, the concentric circles may define different zones indicative of the numeric score for similarity between the search results 420 and the proposed trademark 415. For example, zone 1, the smallest concentric circle, contains search results with a numeric score between 95-100. In some embodiments, a user may click on the zones in the index 475 so that only the search results in the selected zones are displayed.

In this embodiment, the interactive graphical representation 410 includes an x-axis 425 and y-axis 430. The x-axis 425 corresponds to an ascertainable text based property for a textual bias, where the positive x-values correspond to a suffix bias, and the negative x-values correspond to a prefix bias. Further, the y-axis 430 corresponds to an ascertainable text based property for a character length, with larger character lengths corresponding to positive y-values and shorter character length correspond to negative y-values.

The narrow bands along the x-axis and y-axis can define "equivalency zones." In an embodiment, the equivalency zone may represent a "blown up" view of the respective axis. As used herein, the equivalency zone indicates a high level of similarity between the proposed mark and the search result with respect to at least one ascertainable text-based property. For example, if a search result indicator falls in the equivalency zone along the x-axis, this indicates that the search results denoted by the search result indicator are the same or almost exactly the same length as the proposed mark. If a search result indicator falls in the equivalency zone along the y-axis, this indicates that the search results denoted by the search result indicator have no, or almost no, prefix and/or suffix bias.

In another embodiment, the equivalency zone may include search result indicators with one or more ascertainable text-based properties being substantially equal to the proposed trademark. For example, in embodiment implementing an algorithm to determine numeric scores based on similarity and one or more search parameters (such as the "relevance algorithm" described below), a search result and proposed mark may be substantially the same character string, but the search result may still have a low numeric score due to the one or more search parameters. In this example, the search result would be placed in either equivalency zone, but still at a relatively large distance d from the reference indicator. Further examples are provided below.

The interactive graphical representation 410 is intended to allow a user to fully customize, annotate, index, and/or otherwise make use of the search results for a query for a proposed trademark. Thus, the system may receive modifications to the interactive graphical representation 410. For example, the system may allow a user may to select and drag a search result indicator 420 to a new position, in turn altering the first and second offset. In some embodiments, the system may only allow the user the drag a search result indicator 420 radially in toward the reference indicator 415, or radially out away from the reference indicator 415. Such a restriction would only allow a user to modify the numeric score and not the ascertainable text-based properties. However, in some embodiments the system may allow the user to select and drag a search result indicator 420 to any position in the interactive graphical representation 410, in turn altering the numeric score and the ascertainable text-based properties.

In some embodiments, the user can modify the size, shape, color, and/or any other visual property of the search result indicators 420 and/or the reference indicator 415. Further, a user may be able to delete and/or ignore one or more search result indicators 420. In an embodiment, the user may modify the search result indicators 420 directly via the interactive graphical representation 410 or indirectly via the trademark list 435, discussed below. The user may further annotate, highlight, flag, tag or otherwise modify one or more search result indicators 420. Examples of modifying search result indicators 420 with an edit tool are described below with reference to FIG. 6.

The system may further store any changes caused by the received modifications to the search results. The system may store the changes locally and/or at the global database 118a. Further, the system may create a new search result to be stored based on the original search result including changes caused by the received modifications.

The example interface 400 also includes a trademark list 435. The trademark list 435 may act in conjunction with the interactive graphical representation 410. For example, if a user selects a trademark from the trademark list 435, the corresponding search result indicator 420 may be highlighted, and vice versa. The user may also have the ability to add or remove filters 440 and/or tags 445. The user may also use the control bar 450 to further filter search results displayed in the interactive graphical representation. The user may also toggle between algorithms 460. The different algorithms 460 rank search results differently. For example, a similarity algorithm may only rank the search results based only on comparing the string of characters of the proposed mark to the search result, while a relevance algorithm may include the similarity algorithm while also considering one or more additional search parameters.

For example, suppose the system receives a query for a proposed trademark of "tiger" with a given search parameter indicating a selection of Class 25. If the system implements a similarity algorithm, a search result "tiger" may be given a numeric score of 100 regardless of other parameters of the search result. In this case, the system may place the search result indicator in very close proximity to the reference indicator. In contrast, if the system implements a relevance algorithm, if the search result "tiger" does not belong to Class 25, the numeric score may be lower. However, the system may still determine that ascertainable text-based properties for the search result "tiger" to be equivalent to the proposed trademark "tiger" (i.e. the first and second offsets "should" be zero). They system may resolve this discrepancy by placing the search result indicator for "tiger" in the equivalency zone along either axis, based on one or more determining factors (e.g. the search result indicator may be placed in the equivalency zone along the positive x-axis because it is the least cluttered position).

Once the user has completed refining the query and obtained a satisfactory interactive graphical representation 410, the user may export 455 the interactive graphical representation 410 in a number of formats (.PDF, .JPG, etc.).

Figure 5:
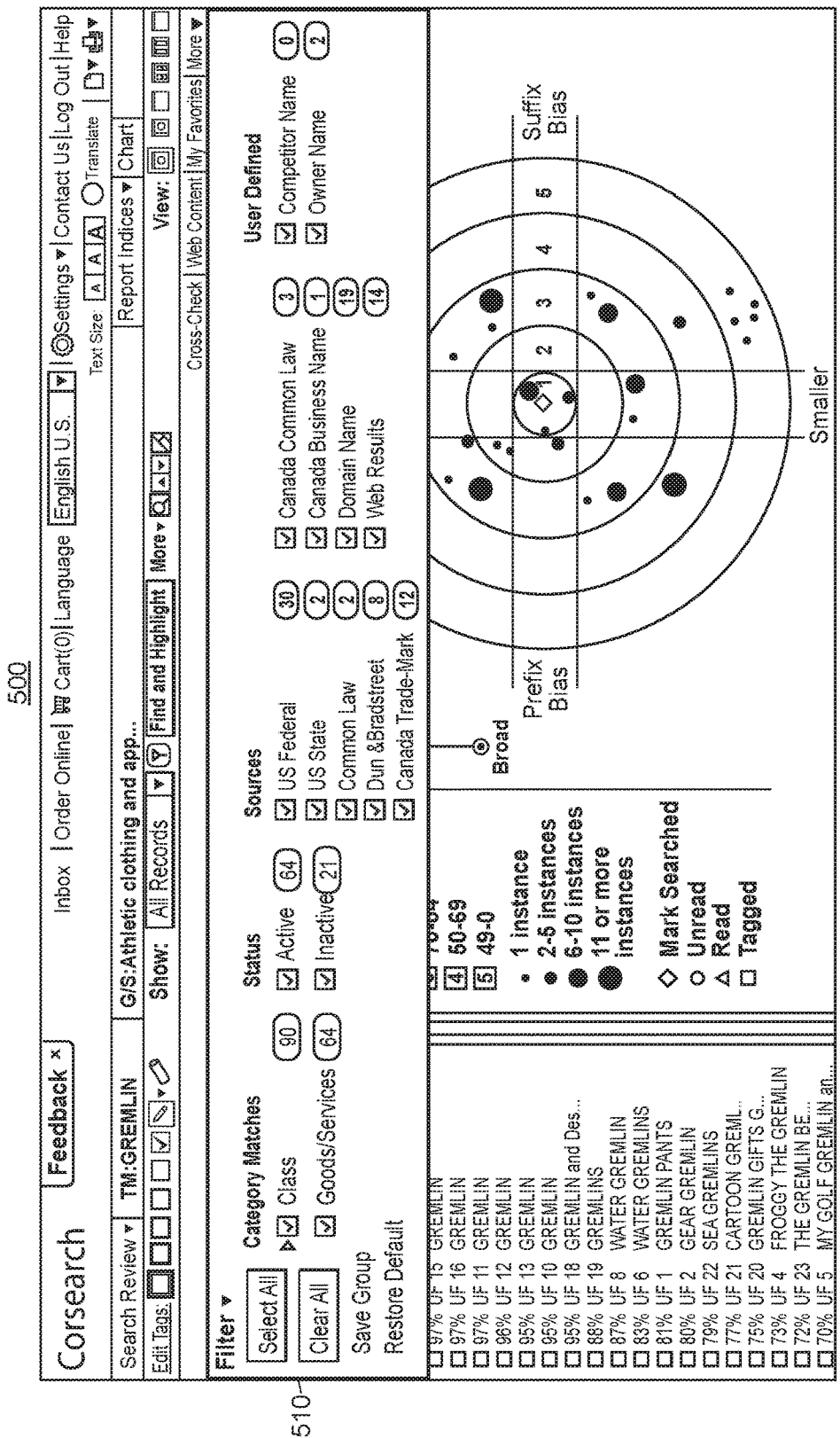
FIG. 5 is an illustration of an exemplary user interface screen which the system of FIG. 1 may generate to provide an interactive graphical representation of search results along with a filter panel.

FIG. 5 is an illustration of an exemplary user interface 500 displaying an interactive graphical representation of search results for a query for a proposed trademark including a filter panel 510. The system may allow a user to implement the filter panel 510 to further refine the query. The filter panel may have some, all and/or additional search parameters as those discussed in relation with FIG. 3. In some embodiments, the user may implement the filter panel 510 to change the proposed trademark, save the search results to a particular query and or restore default search parameters.

FIG. 6 is an illustration of an exemplary user interface 600 displaying an interactive graphical representation of search results for a query for a proposed trademark including a selected search result 615. In the example interface 600, the user has selected a search result 615 via the interactive graphical representation. In another embodiment, the selected search result 615 can be selected through the trademark list. Once the search result 615 is selected, an information box 605 may be displayed to the user. The size and content of the information box 605 may depend on the size of the display screen of the client device. Typically the information box 605 will include as much information regarding the search result 615 as allowed by the size constraints.

Using the information box 605, a user can access an edit tool 610. The edit tool 610 may enable the user to manipulate the search result in a variety of ways. For example, a user can indicate that the search result 615 should be ignored and/or deleted, is not relevant, is highly relevant, is slightly relevant, etc. Further, the user may add notes to be saved with the search result 615. In another embodiment, the user may also modify the numeric score of the search result via the edit tool 610.

FIG. 7 is an illustration of an exemplary user interface 700 displaying a selected search result 705. The user may similarly modify the search result 705 as discussed above with reference to the edit tool 610 of FIG. 6. However, this alternative display of the search result 705 provides a more in-depth overview of the search result.

V. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network 106, may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for presenting search results for a trademark query in an interactive graphical representation through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A system for generating interactive graphical representations of search results for trademark queries implemented in one or more servers and a user device interconnected via a communication network, the system comprising:
    a user interface; and
    a processing hardware configured to:
        retrieve search results responsive to a query, the query including a proposed trademark and one or more search parameters, and each search result having at least one ascertainable text-based property and a numeric score, wherein the numeric score is indicative of a measure of similarity between the search result and the proposed trademark,
        generate an interactive graphical representation of the search results, including:
            generate a reference indicator for the proposed trademark at a reference location in the interactive graphical representation, the reference location defining a center of a circle,
            determine, for each of the search results, a first offset along a first axis that extends on both sides of the center and a second offset along a second axis that extends on both sides of the center and that is perpendicular to the first axis, the first and second offsets being determined relative to the reference location using the numeric score and the at least one ascertainable text-based property of a respective search result, the ascertainable text-based property including both of a prefix bias and a suffix bias, and wherein a negative value of the first offset corresponds to one of the prefix bias or the suffix bias, and a positive value of the first offset corresponds to the other one of the prefix bias or the suffix bias, and
            generate, for each of the search results, a search result indicator in the interactive graphical representation, in accordance with the determined first and second offsets, wherein at least some of the search result indicators are individually selectable to modify the interactive graphical representation, the processing hardware being configured to determine a distance of the search result indicator from the reference location at the center of the circle, based on the numeric score of the search result, the negative value of the first offset corresponds to the one of the prefix bias or the suffix bias being on one side of the center along the first axis and the positive value of the first offset corresponds to the other one of the prefix bias or the suffix bias being on the opposite side of the center along the first axis, a negative value of the second offset corresponding a smaller character length of the search result and being on one side of the center along the second axis and a positive value of the second offset corresponds a larger character length of the search result and being on the opposite side of the center along the second axis, the search result indicators representing search results having a higher numeric score being displayed in the interactive graphical representation as radially closer to the center of the circle than search result indicators representing search results having a lower numeric score; and
        provide the interactive graphical representation via the user interface.

2. The system of claim 1, wherein the processing hardware is further configured to determine a position of the search result indicator around the circle based on the at least one ascertainable text-based property, so that search result indicators representing search results with an identical numeric score but different ascertainable text-based properties are displayed at different positions on a same circle centered at the reference location.

3. The system of claim 1, wherein the first axis is a horizontal axis and the second axis is a vertical axis.

4. The system of claim 1, wherein the one or more search parameters comprise (i) one or more database to be searched, (ii) one or more classes, (iii) one or more keywords corresponding to goods or services, (iv) one or more statuses (v) one or more owner names, or (vi) one or more dates.

5. The system of claim 1, wherein the processing hardware is configured to modify the interactive graphical representation in response to user input using one of (i) a filter applied to one or more search results, (ii) an independent re-ranking of the similarity score of one or more search results, (iii) a removal of one or more search results, (iv) an addition of a note to one or more search results, (v) a selection to view one or more search results, or (vi) an edit of the search query.

6. The system of claim 1, wherein the processing hardware is further configured to:
generate a list of trademarks corresponding to the search results,
display the list of trademarks adjacent to the interactive graphical representation, and
in response to detecting a selection of one of the trademarks in the list, automatically highlight the corresponding selected search result indicator in the graphical representation.

7. A server system configured to generate interactive graphical representations of search results for trademark queries for display on user devices, the server system comprising:
one or more processors;
a non-transitory computer-readable medium coupled to the one or more processors and storing instructions that, when executed by the one or more processors, implement a method comprising:
retrieving search results responsive to a query, the query including a proposed trademark and one or more search parameters, and each search result having at least two ascertainable text-based properties and a numeric score, wherein the numeric score is indicative of a measure of similarity between the search result and the proposed trademark, and
causing a user device to display an interactive graphical representation of the search results via a user interface of the user device, including causing the user device to:
display a reference indicator for the proposed trademark at a reference location in the interactive graphical representation,
display, for each of the search results, a respective search result indicator in the interactive graphical representation at a search result location having a first offset along a first axis that extends on both sides of the center and a second offset along a second axis that extends on both sides of the center and that is perpendicular to the first axis, the first and second offsets being relative to the reference location, wherein the search result location is determined using the numeric score and each of the at least two ascertainable text-based properties of the search result, one of the ascertainable text-based properties including one of a prefix bias or a suffix bias, wherein at least some of the search result indicators are individually selectable, and wherein a negative value of the first offset corresponds to one of the prefix bias or the suffix bias, and a positive value of the first offset corresponds to the other one of the prefix bias or the suffix bias, the other of the at least two ascertainable text-based properties comprising character length of the search result, and display a modified version of the interactive graphical representation in response to one of the search indicators being selected,
the one or more processors being configured to determine a distance of the search result indicator from the reference location based on the numeric score of the search result, the reference location defining a center of a circle, so that search result indicators representing search results having a higher numeric score are displayed in the interactive graphical representation as radially closer to the center of the circle than search result indicators representing search results having a lower numeric score, with search results being displayed on both sides of the center of the circle along the first axis depending on whether the ascertainable text-based property is more like a prefix or more like a suffix of the proposed trademark, and the search results being displayed on both sides of the center of the circle along the second axis depending on whether the character length of the search result is smaller or larger than the character length of the proposed trademark.

8. The system of claim 7, wherein the first axis is horizontal and the second axis is vertical.

9. The system of claim 7, wherein the one or more search parameters comprise (i) one or more database to be searched, (ii) one or more classes, (iii) one or more keywords corresponding to goods or services, (iv) one or more statuses (v) one or more owner names, or (vi) one or more dates.

10. The system of claim 7, wherein the one or more processors are configured to modify the interactive graphical representation in response to user input using one of (i) a filter applied to one or more search results, (ii) an independent re-ranking of the similarity score of one or more search results, (iii) a removal of one or more search results, (iv) an addition of a note to one or more search results, (v) a selection to view one or more search results, or (vi) an edit of the search query.

11. The system of claim 7, wherein the processing hardware is further configured to:
generate a list of trademarks corresponding to the search results,
display the list of trademarks adjacent to the interactive graphical representation, and
in response to detecting a selection of one of the trademarks in the list, automatically highlight the corresponding selected search result indicator in the graphical representation.

12. A method for generating interactive graphical representations of search results for trademark queries, the method comprising:
retrieving, by one or more processors, search results responsive to a query, the query including a proposed trademark and one or more search parameters, and each search result having at least one ascertainable text-based property and a numeric score, wherein the numeric score is indicative of a measure of similarity between the search result and the proposed trademark; and
generating, by one or more processors, an interactive graphical representation of the search results, including:
generating a reference indicator for the proposed trademark at a reference location in the interactive graphical representation,
determining, for each of the search results, a first offset along a first axis that extends on both sides of the center and a second offset along a second axis that extends on both sides of the center and that is perpendicular to the first axis, the first and second offsets being determined relative to the reference location using the numeric score and the at least one ascertainable text-based property of a respective search result, the ascertainable text-based property including one of a prefix bias or a suffix bias, and wherein a negative value of the first offset corresponds to one of the prefix bias or the suffix bias, and a positive value of the first offset corresponds to the other one of the prefix bias or the suffix bias, generating, for each of the search results, a search result indicator in the interactive graphical representation, in accordance with the determined first and second offsets, wherein at least some of the search result indicators are individually selectable to modify the interactive graphical representation, determining, by one or more processors, a distance of the search result indicator from the reference location based on the numeric score of the search result, the reference location defining a center of a circle, so that search result indicators representing search results having a higher numeric score are displayed in the interactive graphical representation as radially closer to the center of the circle than search result indicators representing search results having a lower numeric score, search result with a positive value of the first offset being displayed on one side of the center along the first axis, search result with a negative value of the first offset being displayed on an opposite side of the center along the first axis, and a negative value of the second offset corresponding a smaller character length of the search result and being on one side of the center along the second axis and a positive value of the second offset corresponds a larger character length of the search result and being on the opposite side of the center along the second axis, and providing the interactive graphical representation via a user interface.

13. The method of claim 12, wherein the first axis is horizontal and the second axis is vertical.

14. The method of claim 12, wherein the one or more search parameters comprise (i) one or more database to be searched, (ii) one or more classes, (iii) one or more keywords corresponding to goods or services, (iv) one or more statuses (v) one or more owner names, or (vi) one or more dates.

15. The method of claim 12, further comprising modifying, by one or more processors, the interactive graphical representation in response to user input applying one of (i) a filter applied to one or more search results, (ii) an independent re-ranking of the similarity score of one or more search results, (iii) a removal of one or more search results, (iv) an addition of a note to one or more search results, (v) a selection to view one or more search results, or (vi) an edit of the search query.

16. The method of claim 12, further comprising: generating a list of trademarks corresponding to the search results,
    causing the list of trademarks to be displayed adjacent to the interactive graphical representation, and
    in response to detecting a selection of one of the trademarks in the list, causing the corresponding selected search result indicator in the graphical representation to be automatically highlighted.

* * * * *